(12) United States Patent
Soerensen

(10) Patent No.: US 7,152,401 B2
(45) Date of Patent: Dec. 26, 2006

(54) HYDRAULIC STEERING ARRANGEMENT

(75) Inventor: Ole Vincentz Soerensen, Nordborg (DK)

(73) Assignee: Sauer-Danfoss ApS, Nordborg (DK)

( * ) Notice: Subject to any disclaimer, the term of this patent is extended or adjusted under 35 U.S.C. 154(b) by 151 days.

(21) Appl. No.: 10/865,002

(22) Filed: Jun. 10, 2004

(65) Prior Publication Data

US 2004/0250536 A1    Dec. 16, 2004

(30) Foreign Application Priority Data

Jun. 11, 2003 (DE) ............... 103 26 245

(51) Int. Cl.
*F16D 31/02*   (2006.01)
(52) U.S. Cl. .......................... 60/386; 60/405
(58) Field of Classification Search ........ 180/403, 180/417, 441; 91/516; 60/386, 405
See application file for complete search history.

(56) References Cited

U.S. PATENT DOCUMENTS

| 6,405,824 B1 | 6/2002 | S.o slashed.rensen et al. |
| 2001/0020557 A1* | 9/2001 | Giversen et al. ............ 180/417 |

* cited by examiner

*Primary Examiner*—F. Daniel Lopez
(74) *Attorney, Agent, or Firm*—McCormick, Paulding & Huber LLP

(57) ABSTRACT

A hydraulic steering arrangement includes a steering valve, a steering motor, connected with a high-pressure connection and a low-pressure connection via the steering valve, and with a steering unit, connected via the steering valve with a pilot pressure valve, whose outlet is connected with the low-pressure connection. It is endeavoured to improve the steering behaviour. For this purpose, the pilot pressure valve is opened, before the steering valve creates a connection between the high-pressure connection and the steering motor.

16 Claims, 2 Drawing Sheets

HYDRAULIC STEERING ARRANGEMENT

CROSS-REFERENCE TO RELATED APPLICATIONS

This application is entitled to the benefit of and incorporates by reference essential subject matter disclosed in German Patent Application No. 103 26 245.8 filed on Jun. 11, 2003 and German Patent Application No. 10 2004 027 971.3 filed Jun. 8, 2004.

FIELD OF THE INVENTION

The invention concerns a hydraulic steering arrangement with a steering valve, a steering motor, which is connected with a high-pressure connection and a low-pressure connection via the steering valve, and with a steering unit, connected via the steering valve with a pilot pressure valve, whose outlet is connected with the low-pressure connection.

BACKGROUND OF THE INVENTION

Such a hydraulic steering arrangement is known from DE 199 31 143 A1. Here, the steering unit is driven by a steering handwheel or another activation device. A steering angle sensor determines the deflection of the steering unit and passes this information on to a control device, which activates a slide (or another valve element), that forms part of the steering valve. Depending on the steering direction, the steering valve then releases a connection between the high-pressure connection and one of the two connections of the steering motor, and between the other of the two connections of the steering motor and the low-pressure connection, so that the steering motor is activated and changes the angle position of steered wheels. At the same time, hydraulic fluid is led from the steering unit through the steering valve to the pilot pressure valve. The pilot pressure valve builds up a certain resistance against the discharge of the hydraulic fluid from the steering unit to give the driver an improved steering feeling.

However, when employing the above-described arrangement, it has been observed that the steering behaviour is not satisfactory in all cases. First, a delay of the steering occurs. Secondly, a jerk phenomenon occurs, that is, an increased side acceleration, which the driver finds uncomfortable, particularly when using the steering arrangement in vehicles with artic frame steering.

Based on the foregoing, it is the general object of the present invention to provide a steering arrangement that improves upon or overcomes the problems associated with the prior art.

SUMMARY OF THE INVENTION

With a steering arrangement as mentioned hereinabove, and in accordance with the present invention, the pilot pressure valve is opened, before the steering valve creates a connection between the high-pressure connection and the steering motor.

Accordingly, at the beginning of a steering process an outflow of the hydraulic fluid, which is supplied by the steering unit, through the pilot pressure valve is possible. Thus, delays are avoided. At the same time, it becomes possible to use the hydraulic fluid, which is supplied by the steering unit, for controlling the slide (or another valve element) of the steering valve. This is an advantage, when the steering unit is also used as an emergency steering pump, so that during a failure of the pump, which supplies the pressure at the high-pressure connection, reliable steering of the vehicle is still possible. In the normal state, a control device then activates the steering valve, for example by means of electromagnets. The use of the pilot pressure valve, avoids the situation wherein the pressures, which are supplied by the steering unit, superpose the pressures from the control device. The pilot oil supply is located on the primary side, which causes a reduced pressure drop in relation to a system, in which the pilot oil supply is located on the secondary side. In such a system, a relatively large amount of oil had to be lifted to the pressure level, which was also needed in the pilot oil supply. This led to oversteering of the steering valve, which again caused an undesired occurrence of jerk. Locating the pilot oil supply on the primary side reduces this problem.

Preferably, the pilot pressure valve is acted upon in the opening direction by the pressure at the high-pressure connection and in the closing direction by the pressure in a load sensing system and the force of a spring. Thus, the pilot pressure valve is opened, as soon as the pressure at the high-pressure connection increases so much that it exceeds the force of the spring. At this time, the pressure in the load sensing system is not yet large enough to close the pilot pressure valve. The pressure in the load sensing system does not increase, until the steering motor in a corresponding working chamber is supplied with the required pressure.

In an alternative embodiment, the pilot pressure valve is acted upon in the opening direction by the force of a spring and a first pressure in the load sensing system and in the closing direction by a second pressure in the load sensing system, the first pressure originating from an area at the high-pressure connection and the second pressure originating from an area at the steering valve, both areas being connected with each other through a unidirectionally working pressure separation device. When the same pressure rules in the whole load sensing system, the pilot pressure valve is held in the open position by the force of the spring. In this connection, the pressure separation device works unidirectionally, that is, it leads a pressure from the first area on to the second area. The pressure drop over the pressure separation device is insignificant. When, however, the pressure in the first area, that is, at the pressure connection, drops, for example because a pressure limiting valve opens, the pressure at the steering valve, however, increases, for example because the steering motor connected with the steering valve runs to the stop, the pressure in the second area becomes larger than the pressure in the first area. When the pressure difference becomes so large that it overcomes the force of the spring, the pilot pressure valve is throttled or closed.

Preferably, the spring loading the pilot pressure valve generates a force, which corresponds to a pressure of maximum 5 bar. Thus, the spring is relatively weakly dimensioned, so that already with small pressures at the high-pressure connection or small pressure differences over the pressure separation device, respectively, an opening of the pilot pressure valve can be effected. The force of the spring at the pilot pressure valve should be smaller than the standby pressure in the system, which is determined by the priority valve.

Preferably, a pipe between the steering valve and the low-pressure connection is open, at least at the beginning of a steering process. Thus, the return flow of the hydraulic fluid from the steering motor to the low-pressure connection is possible practically without problems. No delays are caused by valves in this pipe, which have to be opened first.

On the contrary, at least at the beginning of a steering process, a free passage exists from the steering motor to the low-pressure connection, when the steering valve releases this path.

It is preferred that a braking valve is located in the pipe, said valve being acted upon in the opening direction by the pressure in the load-sensing system and in the closing direction by the force of a spring. Also this spring can be sized to be relatively weak, and produce a force, which corresponds to a closing pressure in the magnitude of maximum 5 bar. Thus, the braking valve does not start closing, until the pressure in the load sensing system gets below the force of the spring. This is, for example, the case, when negative loads act upon the steered wheels. In this case, the braking valve prevents a fast discharge of fluid from the steering motor. On the contrary, the braking valve throttles this discharge. On the spring-loaded side, the tank pressure also acts upon the braking valve. When the pressure in the load sensing system (LS-system) is smaller than the sum of the tank pressure and the spring, braking is required.

It is preferred that between the braking valve and the steering valve an emergency steering line branches off, which is connected with a pressure inlet of the steering unit via a non-return valve opening in the direction of the steering unit. In this case, the steering valve can, in an improved manner, be used for an emergency steering. As long as the pressure at the pressure inlet of the steering unit is larger than the pressure at the steering valve, the non-return valve is closed. When, however, the pressure at the pressure inlet of the steering unit drops, for example because the supply via the pump fails, the steering valve can supply sufficient hydraulic fluid via the non-return valve to initiate the emergency steering of the vehicle.

Preferably, the high-pressure connection is connected with an overpressure valve, which is connected with the low-pressure connection. Together with the pilot pressure valve, this overpressure valve enables an endstop function. When the steering motor is taken to an end position, the pressure at the high-pressure connection could increase so much that the steering motor is damaged. In the first line, the overpressure valve limits the size of this pressure. At the same time, however, the pressure in the load-sensing system also increases. The pressure in the load-sensing system then gets at least as large as the pressure at the high-pressure connection. Together with the force of the spring, the pressure in the load-sensing system is then sufficient to close the pilot pressure valve. Thus, however, it is prevented that hydraulic fluid from the steering unit can flow off via the pilot pressure valve. The hydraulic fluid trapped in the steering unit then signals to the driver, that the steering motor is in the end position. A further turning of the steering handwheel is thus, in a manner of speaking, mechanically prevented, without requiring the fitting of mechanical stops.

It is preferred that the high-pressure connection is connected with the overpressure valve via the load-sensing system. Basically, no large amount of hydraulic fluid has to be discharged. Therefore, it is sufficient to use the comparatively small cross-sections of the available load-sensing system for the pressure reduction. This keeps the manufacturing costs low.

Preferably, a non-return valve opening in the direction of the pilot pressure valve is located in a load-sensing pipe between the high-pressure connection and the pilot pressure valve. On the one hand, this non-return valve enables the pressure from the high-pressure connection to reach the pilot pressure valve. However, it prevents an increased load pressure, which occurs in the steering valve, for example generated by negative loads, from getting through to the pump, which supplies the pressure to the high-pressure connection.

Preferably, a priority valve is located between the high-pressure connection and the steering valve, said priority valve having a position indication. In many cases, a priority valve is used not only for supplying the steering of a vehicle, but also other consumers, with hydraulic fluid. The priority valve then ensures that, when the steering needs hydraulic fluid, this is primarily supplied to the steering. The remaining hydraulic consumers are then, at least temporarily, out of operation. The position indication now provides the priority valve with an additional property: the driver is informed that the available amount of the supplied hydraulic fluid is no longer sufficient for the supply of additional consumers. He thus learns that the hydraulic supply is approaching its capacity limit. In this case, the driver knows that he must anticipate that the steering will work more slowly than in a case, where the full capacity of the hydraulic supply is available. The driver can adapt his steering behaviour accordingly and, for example, slow down his steering movements.

In a particularly favourable embodiment this is realised in that the priority valve has three outlets, a first outlet being connected with the steering valve, a second outlet with the steering unit and a third outlet with additional consumers, and in a priority position, in which the third outlet is closed, the second outlet is connected, via a path, with an inlet of the priority valve, which has a larger flow resistance than a path between the inlet and the first outlet. Thus, it is ensured that the steering valve is still supplied practically without pressure loss. The larger throttling resistance between the inlet and the second outlet, however, causes a reduced pressure at the steering unit. This reduced pressure is then an indication to the driver that the steering is slower and the high-pressure connection is undersupplied.

BRIEF DESCRIPTION OF THE DRAWINGS

In the following, the invention is explained in detail on the basis of preferred embodiments in connection with the drawings, showing.

DETAILED DESCRIPTION OF THE PREFERRED EMBODIMENTS

Figure 1:
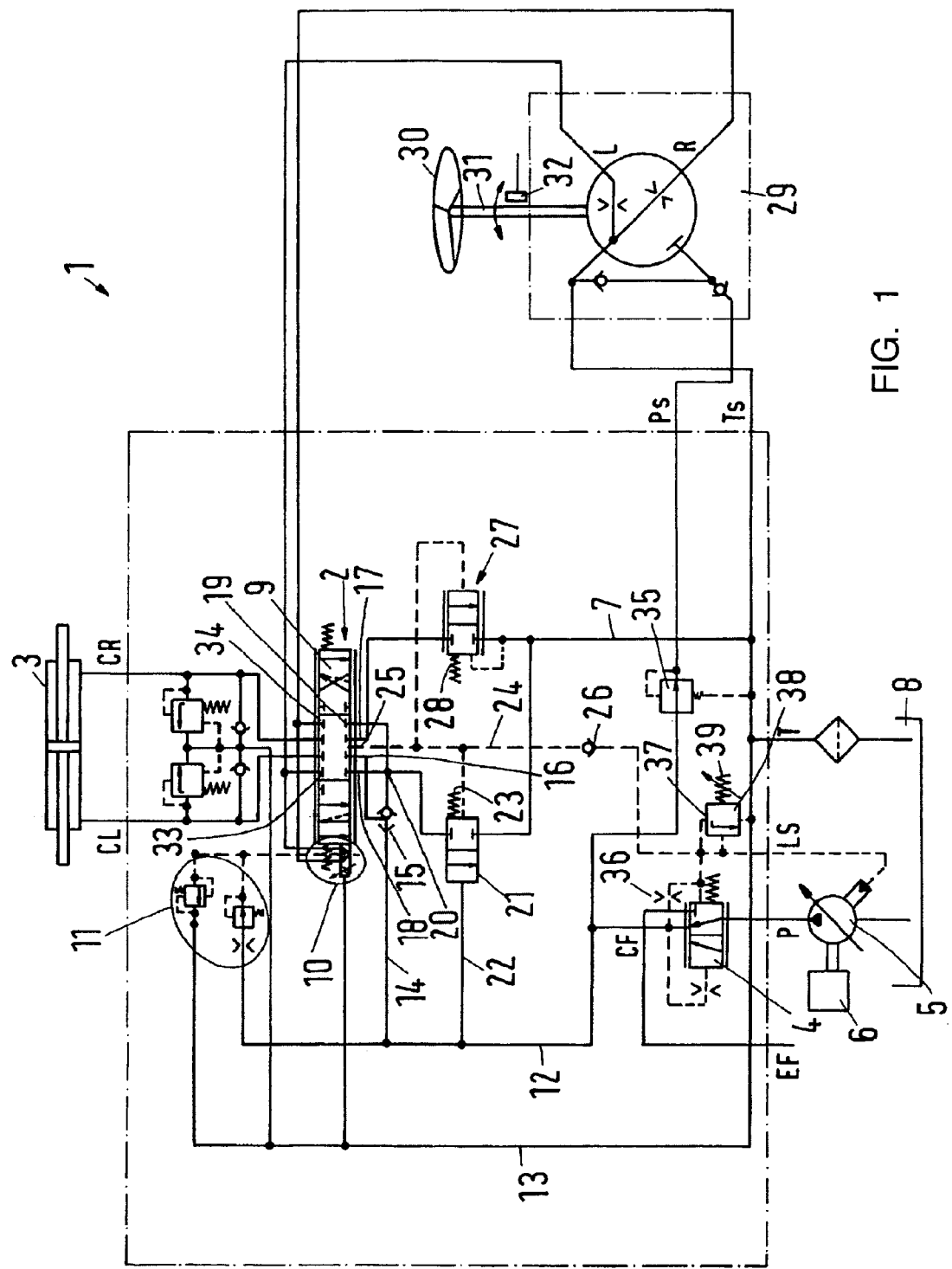
FIG. 1 is a schematic view of a hydraulic steering arrangement

A hydraulic steering arrangement 1 has a steering valve 2, whose outlet side is connected with a steering motor 3. The inlet side of the steering valve 2 is connected with a high-pressure connection CF, which is formed by the outlet of a priority valve 4. The priority valve 4 is connected with a pump 5, which is driven by an only schematically shown vehicle motor 6. The pump 5 is controlled by a load-sensing system LS. In a manner known per se, via a connection EF, the priority valve 4 supplies further hydraulic consumers on the vehicle, which are steered by means of the steering arrangement 1. However, it ensures that the steering arrangement 1 is supplied with the required amount of hydraulic fluid.

Via a pipe 7, the steering valve 2 is connected with a low-pressure connection T, which is connected with a container or a tank 8.

The steering valve 2 has a slide 9, which can be displaced by a merely schematically shown drive control 10. The drive control 10 has solenoid valves, which make a pressure from a supply device 11 act upon the slide 9 to displace it. The drive control 10 is only located at one end of the slide 9. However, the drive control 10 is able to displace the slide 9 in two directions.

The supply device 11 is connected with the high-pressure connection CF via a pipe 12 and with the low-pressure connection T via a pipe 13. Accordingly, it is able to provide a pressure in the magnitude of approximately 12 bar for driving the slide 9.

From the pipe 12 a line 14 branches off to a shuttle valve 15, whose outlet is connected with a pressure inlet 16 of the steering valve 2. A tank outlet 17 of the steering valve 2 is connected with the pipe 7 to the low-pressure connection T.

The steering valve 2 has two counter-pressure outlets 18, 19, which are joined at a point 20 and connected with the other inlet of the shuttle valve 15. The point 20 is also connected with a pilot pressure control valve 21, whose outlet is connected with the pipe 7 to the low-pressure connection T.

The pilot pressure control valve is, as shown schematically in the figure, acted upon in the opening direction by the pressure at the high-pressure connection CF via a pipe 22, which is connected with the high-pressure connection CF. In the closing direction, the pilot pressure control valve 21 is acted upon by the force of a spring 23 and by the pressure in a load sensing pipe 24. The load sensing pipe 24 is connected on the one side with a load sensing connection 25 on the steering valve 2 and on the other side with the load sensing connection LS via a non-return valve 16 opening in the direction of the steering valve 2. Accordingly, the pressure at the load sensing connection LS or at the load sensing connection 25, depending on which pressure is higher, is acting upon the pilot pressure control valve 21 in the closing direction.

In the pipe 7 is located a braking valve 27, which is acted upon in the closing direction by the force of a spring 28 and the pressure at the low-pressure connection T. In the opening direction, the pressure in the load-sensing pipe 24 is acting upon the braking valve 27.

A steering unit 29 is activated by a steering handwheel 30. A steering handwheel shaft 31 is provided with a steering angle sensor 32, which reports a steering angle determined by the steering handwheel 30 to the drive control 10 to displace the slide 9 of the steering valve 2 accordingly.

An outlet L of the steering unit 29 is connected with a steering inlet 33 and an outlet R of the steering unit 29 is connected with a control inlet 34 of the steering valve 2. Both outlets L, R of the steering unit 29 are also connected with the drive control 10, as known from DE 199 31 143 A1. Through these connections, it is possible to use the steering unit 29 as emergency steering pump, that is, also to control the slide 9 of the steering valve 2, when the pump 5 no longer supplies the required pressure at the high-pressure connection CF.

The steering unit 29 has an inlet Ps, which is connected with the high-pressure connection CF via a pressure control valve 35. Thus, the maximum pressure, which can occur in the steering unit 29, is controlled by the pressure control valve, for example, maximum 30 bar. A connection Ts of the steering unit 29 is connected with the low-pressure connection T.

The high-pressure connection CF is connected with the load-sensing connection LS via a throttle 36. The load-sensing connection LS is connected with the inlet 37 of an overpressure valve 38. The overpressure valve 38 is also connected with the low-pressure connection T. The overpressure valve 38 is opened by the pressure at the load-sensing connection LS against the force of a spring 39, when the pressure at the load-sensing connection LS exceeds the force of the spring 39.

Providing the non-return valve 26 is advantageous for the function of the braking valve 27. When the overpressure valve 38 opens, only the load-sensing pressure to the non-return valve 26 is influenced, and thus it becomes possible to achieve the desired function through the pilot pressure valve 21.

The steering unit 1 now works as follows:

When the steering handwheel 30 is in its neutral position, the straight ahead driving position, also the slide 9 of the steering valve 2 is in its neutral position shown in the figure. At the high-pressure connection CF rules a pressure supplied by the pump 5, which can be relatively small as "idling pressure", however, usually exceeding the force of the spring 23, so that the pilot pressure valve 21 opens. For this purpose, a pressure in the pipe 12 is sufficient, which exceeds the pressure at the load-sensing connection LS by, for example, somewhat over 4 bar.

When the steering handwheel 30 is activated, the slide 9 of the steering valve 2 is displaced via the drive control 10, for example to the right (in relation to the view in the figure), so that the high-pressure connection CF is connected with the connection CL of the steering motor 3 via the pipes 12, 14 and the shuttle valve 15. At the same time, the connection CR is connected with the pipe 7. The control inlet 33 is connected with the counter-pressure control outlet 18, so that hydraulic fluid, which is supplied by the steering unit 29 via its outlet L, can flow off via the pilot pressure control valve 21. As soon as the slide 9 connects the pressure inlet 16 with the connection CL of the steering motor 3, the pressure at the load-sensing connection 25 increases. Thus, the braking valve 27 is opened against the force of the spring 28, even before the hydraulic fluid flows back from the connection CR of the steering motor 3. The fluid flowing back from the connection CR thus meets a completely open pipe 7.

In case that negative forces act upon the steering motor 3, the pressure in the load-sensing pipe 24 drops under the force of the spring 28, for example below 4 bar. In this case, the braking valve 27 closes somewhat to be able to throttle the discharge of hydraulic fluid from the steering motor 3 somewhat.

The fact that the fluid from the steering unit 29 can flow off via the pilot pressure valve 21 at the beginning of the steering movement causes that the driver feels no jerk when moving the steering handwheel 30 and does not have to overcome an unpleasant dead point. At the same time, the discharge of fluid from the steering unit 29 ensures that the slide 9 is only controlled by the drive control 10. Thus, it is prevented that the slide 9 exceeds its desired position, so that no unpleasant side accelerations (jerk) occur when steering the vehicle.

When the steering motor 3 has been driven to its end position, the pressure at the corresponding connection increases. Via the throttle 36, this pressure increase reaches the load-sensing connection LS and via the non-return valve 26 it reaches the load-sensing pipe 24. As soon as the pressure in the load-sensing pipe 24 together with the force of the spring 23 exceeds the pressure at the high-pressure connection CF, the pilot pressure valve 21 is closed, thus preventing that further hydraulic fluid can escape from the steering unit 29 through the steering valve 2. The movement of the steering handwheel 30 is thus blocked by fluid trapped in the steering unit 29. This is a clear indication to the driver that the steered wheels have reached their end position and that a further activation of the steering handwheel 30 would be in vain or even harmful.

During a failure of the pump 5, the steering unit 29 is used as emergency steering. In this case, the pressure at the two counter-pressure control outlets 18, 19 and thus at the point 20 exceeds the pressure at the high-pressure connection CF, so that the shuttle valve 15 changes over. At the same time, the spring 23 closes the pilot pressure valve 21, so that the hydraulic fluid supplied to the point 20 can be supplied to the connections CL, CR (depending on the desired direction) via the shuttle valve 15. The braking valve 27 is opened, so that the hydraulic fluid displaced from the respective other connection CR, CL, can flow off to the low-pressure connection T.

Figure 2:
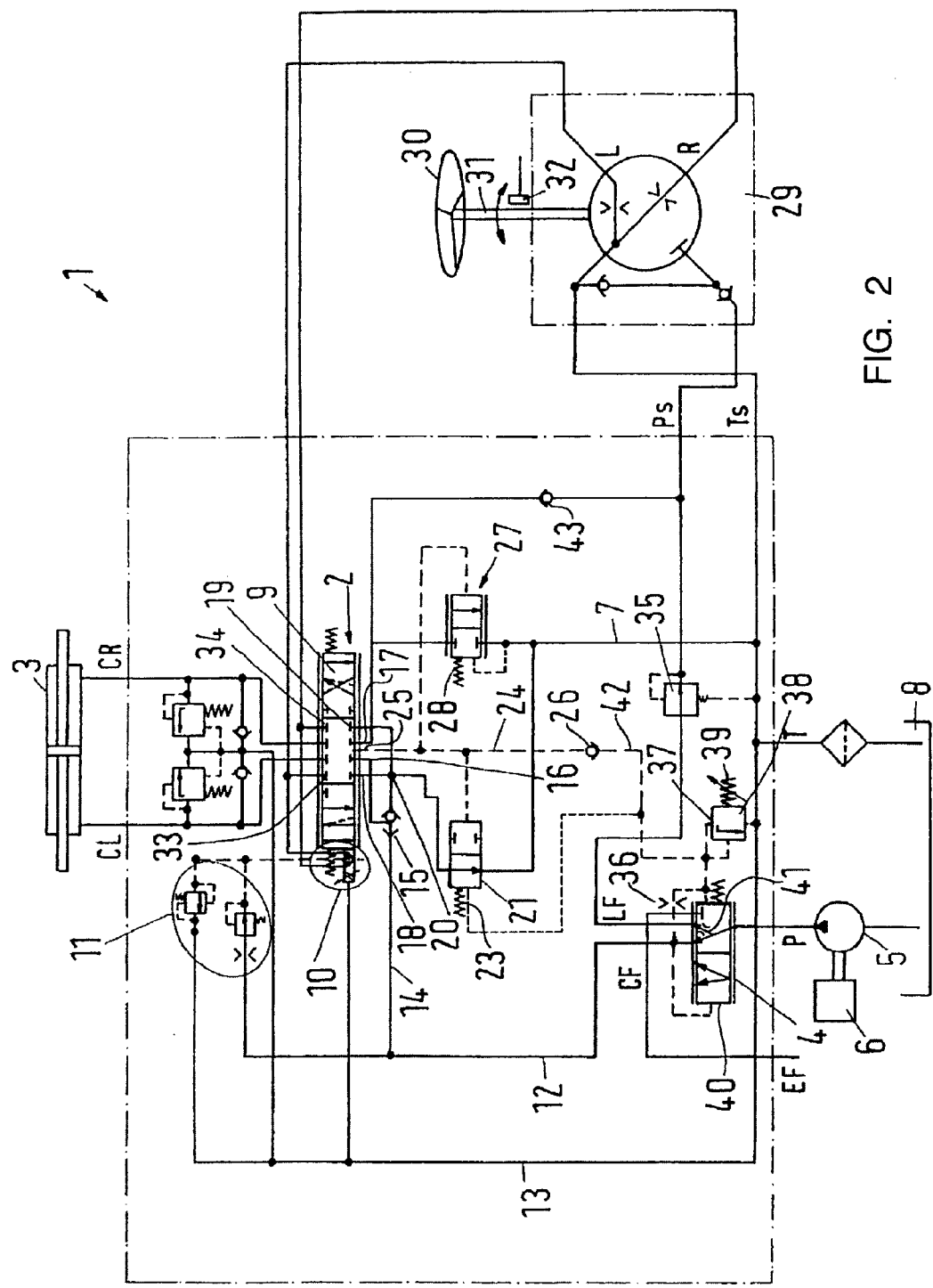
FIG. 2 is a schematic view of a modified form of a steering arrangement

FIG. 2 shows a modified embodiment of a steering arrangement, in which the same and functionally the same elements have the same reference numbers.

Firstly, the pump 5 is no longer a variable pump, but a constant pump with a fixed displacement. However, the LS-connection can still be led out of the steering arrangement.

The priority valve 4 now has three outlets, namely a first outlet CF, which is connected with the steering valve 2, a second outlet LF, which is connected with the steering unit 29 and a third outlet EF, which is connected with additional, not shown consumers. In the position shown, the priority valve 4 is set so that the third outlet EF is closed, that is; the additional consumers receive no hydraulic fluid. The hydraulic fluid is exclusively made available for the steering. In order to report this to a driver, who activates the steering unit 29, the slide 40 (of course also other valve elements are possible) of the priority valve 4 is provided with a throttle 41, which branches off from a connection path between the inlet of the priority valve and the first outlet CF. When the priority valve 4 is in the position shown, the steering unit 29 will then be supplied with a reduced pressure, namely the pressure from the outlet of the pump 5 reduced by the pressure drop at the throttle 41. Accordingly, the steering behaviour is somewhat slower. This indicates to the driver that he is approaching the limit of the capacity of the system, which supplies the steering arrangement 1. He can then adapt his driving behaviour to this, for example by avoiding making very fast steering deflections.

The pilot pressure valve 21 is now controlled in a different manner. The spring 23 now acts in the opening direction. In the opening direction also acts the pressure from a section 42 of the load-sensing pipe, which is connected with the first outlet CF of the priority valve 4 via the throttle 36. In the closing direction acts the pressure of the load-sensing pipe 24, which is connected with the load-sensing connection 25 of the steering valve 2. The load-sensing pipe 24 is separated from the section 42 by the non-return valve 26, which opens in the direction of the steering valve 2. When the pressure in the section 42 is larger than the pressure at the load-sensing connection 25, the two sections of the load-sensing pipe 24, 42 are supplied with the same pressure. A pressure balance then exists over the pilot pressure valve 21, so that the spring 23 opens the pilot pressure valve 21. The pressure drop at the non-return valve 26, which here forms a unidirectionally acting pressure separation device, is here insignificant. When, however, the motor 3 reaches an endstop, the pressure at the load-sensing connection 25 of the steering valve 2 will increase, and the overpressure valve 38 will open, so that the pressure in the section 42 will be lower than the pressure in the load-sensing pipe 24 between the non-return valve 26 and the load-sensing connection 25. When the pressure in the load-sensing pipe 24 between the non-return valve 26 and the load-sensing connection 25 is large enough, this pressure will overcome the force of the spring 23 and close the pilot pressure valve.

Additionally to the embodiment according to FIG. 1, it is also provided that the tank outlet 17 of the steering valve 2 is connected with the pressure inlet Ps of the steering unit 29 via a non-return valve 43, the non-return valve 43 opening in the direction of the steering unit 29. This non-return valve 43 is particularly useful in an emergency steering situation, in which the steering valve 2 acts as pressure source. It is substantially easier to open the non-return valve 43 than the braking valve 27. As long as a sufficient pressure is available, the pressure at the pressure inlet Ps of the steering unit 29 is higher anyway than the pressure at the tank outlet 17 of the steering valve 2, so that here no undesired influencing can take place.

Of course, such a non-return valve 43 can also be used in the embodiment according to FIG. 1. Also the priority valve 4 with three outlets can be used in the embodiment according to FIG. 1.

The embodiment according to FIG. 2 can also be driven with a "normal" priority valve, which is shown in FIG. 1.

What is claimed is:

1. A hydraulic steering arrangement comprising:
   a steering valve;
   a high-pressure connection;
   a low-pressure connection;
   a steering motor, which is connected with the high-pressure connection and the low-pressure connection via the steering valve;
   a pilot pressure valve, an outlet of the pilot pressure valve being connected with the low pressure connection; and
   a steering unit, connected via the steering valve with the pilot pressure valve;
   wherein the pilot pressure valve is opened, before the steering valve creates a connection between the high-pressure connection and the steering motor; and
   wherein, when sufficient pressure from the high-pressure connection is unavailable the pilot pressure valve is closed, and the steering valve creates a connection between the steering unit and the steering motor.

2. The steering arrangement according to claim 1, wherein the high-pressure connection is connected with an overpressure valve, which is connected with the low-pressure connection.

3. The steering arrangement according to claim 2, wherein the high-pressure connection is connected with the overpressure valve via the load-sensing system.

4. A hydraulic steering arrangement comprising:
   a steering valve;
   a high-pressure connection;
   a low-pressure connection;
   a steering motor, which is connected with the high-pressure connection and the low-pressure connection via the steering valve;
   a pilot pressure valve, an outlet of the pilot pressure valve being connected with the low pressure connection; and
   a steering unit, connected via the steering valve with the pilot pressure valve;
   wherein the pilot pressure valve is opened, before the steering valve creates a connection between the high-pressure connection and the steering motor; and
   wherein the pilot pressure valve is acted upon in a opening direction by the force of a spring located adjacent thereto and a first pressure in a load sensing system and in a closing direction by a second pressure in the load sensing system, the first pressure originating from an area at the high-pressure connection and the second pressure originating from an area at the steering valve, both areas being in fluid communication with each other through a unidirectionally working pressure separation device.

5. The steering arrangement according to claim 4, wherein the spring loading the pilot pressure valve generates a force, which corresponds to a maximum pressure of 5 bar.

6. A hydraulic steering arrangement comprising;
a steering valve;
a high-pressure connection;
a low-pressure connection;
a steering motor, which is connected with the high-pressure connection and the low-pressure connection via the steering valve;
a pilot pressure valve, an outlet of the pilot pressure valve being connected with the low pressure connection;
a steering unit, connected via the steering valve with the pilot pressure valve; and
a spring positioned adjacent said pilot pressure valve;
wherein the pilot pressure valve is opened, before the steering valve creates a connection between the high-pressure connection and the steering motor; and
wherein the pilot pressure valve is acted upon in an opening direction by pressure at the high-pressure connection and in a closing direction by pressure in a load sensing system and the force of the spring.

7. The steering arrangement according to claim 6, wherein the spring loading the pilot pressure valve generates a force, which corresponds to a maximum pressure of 5 bar.

8. The steering arrangement according to claim 7, further comprising a pipe positioned between the steering valve and the low-pressure connection the pipe being open, at least at the beginning of a steering process.

9. The steering arrangement according to claim 8, further comprising a braking valve located in the pipe, the braking valve being acted upon in the opening direction by the pressure in the load-sensing system and in the dosing direction by the force of the spring.

10. The steering arrangement according to claim 9, wherein between the braking valve and the steering valve an emergency steering line branches off, which is connected with a pressure inlet of the steering unit via a non-return valve opening in the direction of the steering unit.

11. The steering arrangement according to claim 6, further comprising a pipe positioned between the steering valve and the low-pressure connection the pipe being open, at least at the beginning of a steering process.

12. The steering arrangement according to claim 11, further comprising a braking valve located in the pipe, the braking valve being acted upon in the opening direction by the pressure in the load-sensing system and in the closing direction by the force of the spring.

13. The steering arrangement according to claim 12, wherein between the braking valve and the steering valve an emergency steering line branches off, which is connected with a pressure inlet of the steering unit via a non-return valve opening in the direction of the steering unit.

14. A hydraulic steering arrangement comprising:
a steering valve;
a high-pressure connection;
a low-pressure connection;
a steering motor, which is connected with the high-pressure connection and the low-pressure connection via the steering valve;
a pilot pressure valve, an outlet of the pilot pressure valve being connected with the low pressure connection;
a steering unit, connected via the steering valve with the pilot pressure valve; and
a non-return valve opening in the direction of the pilot pressure valve, the non-return valve being located in a load-sensing pipe between the high-pressure connection and the pilot pressure valve;
wherein the pilot pressure valve is opened, before the steering valve creates a connection between the high-pressure connection and the steering motor.

15. A hydraulic steering arrangement comprising:
a steering valve;
a high-pressure connection;
a low-pressure connection;
a steering motor, which is connected with the high-pressure connection and the low-pressure connection via the steering valve;
a pilot pressure valve, an outlet of the pilot pressure valve being connected with the low pressure connection;
a steering unit, connected via the steering valve with the pilot pressure valve; and
a priority valve located between the high-pressure connection and the steering valve, the priority valve being adapted to indicate a capacity limit of the steering arrangement is being approached;
wherein the pilot pressure valve is opened, before the steering valve creates a connection between the high-pressure connection and the steering motor.

16. The steering arrangement according to claim 15, wherein the priority valve has three outlets, a first outlet being connected with the steering valve, a second outlet being connected with the steering unit and a third outlet with additional consumers, the third outlet being in a priority position, in which the third outlet is closed, the second outlet is connected, via a path, with an inlet of the priority valve, which has a larger flow resistance than a path between the inlet and the first outlet.

* * * * *

UNITED STATES PATENT AND TRADEMARK OFFICE
CERTIFICATE OF CORRECTION

| | | |
|---|---|---|
| PATENT NO. | : 7,152,401 B2 | Page 1 of 1 |
| APPLICATION NO. | : 10/865002 | |
| DATED | : December 26, 2006 | |
| INVENTOR(S) | : Ole Vincentz Soerensen | |

It is certified that error appears in the above-identified patent and that said Letters Patent is hereby corrected as shown below:

Column 9, Claim 9, line 41, delete the word "dosing" and replace with --closing--.

Signed and Sealed this

Twentieth Day of March, 2007

JON W. DUDAS
*Director of the United States Patent and Trademark Office*